United States Patent [19]

Brueckheimer et al.

[11] Patent Number: 5,930,253
[45] Date of Patent: Jul. 27, 1999

[54] NARROW BAND ATM SWITCH ARRANGEMENT FOR A COMMUNICATIONS NETWORK

[75] Inventors: Simon Daniel Brueckheimer, Church Crescent; Roy Harold Mauger, Radlett, both of United Kingdom

[73] Assignee: Northern Telecom Limited, Montreal, Canada

[21] Appl. No.: 08/894,719

[22] PCT Filed: Feb. 9, 1996

[86] PCT No.: PCT/GB96/00302

§ 371 Date: Dec. 1, 1997

§ 102(e) Date: Dec. 1, 1997

[87] PCT Pub. No.: WO96/25017

PCT Pub. Date: Aug. 15, 1996

[30] Foreign Application Priority Data

Feb. 9, 1995 [GB] United Kingdom .................. 9502552

[51] Int. Cl.⁶ .............................. H04L 12/28; H04L 12/56
[52] U.S. Cl. ............................................ 370/395; 370/419
[58] Field of Search ................................ 370/395, 464, 370/465, 474, 476, 471, 489, 396, 468, 327, 340, 347, 359, 398, 419, 420, 397, 399, 409, 422, 433

[56] References Cited

U.S. PATENT DOCUMENTS

| 5,220,563 | 6/1993 | Grenot et al. ............................ 370/396 |
| 5,311,509 | 5/1994 | Heddes et al. ........................... 370/471 |
| 5,402,415 | 3/1995 | Turner ..................................... 370/398 |
| 5,526,349 | 6/1996 | Diaz et al. ............................... 370/474 |
| 5,555,244 | 9/1996 | Gupta et al. ............................. 370/471 |
| 5,568,477 | 10/1996 | Galand et al. ........................... 370/395 |
| 5,790,522 | 8/1998 | Fichou et al. ............................ 370/468 |

*Primary Examiner*—Dang Ton
*Assistant Examiner*—Phirin Sam
*Attorney, Agent, or Firm*—Lee, Mann, Smith, McWilliams, Sweeney & Ohlson

[57] ABSTRACT

Interworking between narrow band and broad band traffic in an ATM network is provided by a narrow band switch having a point to multipoint capability. Narrow band channels are mapped to time slots in broad band virtual circuits by providing a mapping between channel addresses and virtual circuit payloads. The narrow band traffic is interfaced to the broad band ATM network via a network of adaptive virtual junctors each of which comprises an n×64 kbit/s connection so that the cell assembly delay is reduced by a factor of 1/n. this overcomes the assembly delay problem without the need to resort to unproductive padding. Further, by providing dynamic capacity adjustment of the virtual circuits between the junctors, maximum use is made of the available capacity without the need for the permanent reservation of capacity which may be unused for much of the time.

6 Claims, 6 Drawing Sheets

NARROW BAND ATM SWITCH ARRANGEMENT FOR A COMMUNICATIONS NETWORK

This invention relates to digital communications systems and in particular to systems embodying asynchronous transfer mode (ATM) technology. The invention further relates to an apparatus and method of switching narrow band traffic in such a system.

BACKGROUND OF THE INVENTION

The asynchronous transfer mode (ATM) technology is a flexible form of transmission which allows any type of service traffic, voice, video or data, to be multiplexed together on to a common means of transmission. In order for this to be realised, the service traffic must first be adapted typically into 53 byte cells comprising 5 byte headers and 48 byte payloads such that the original traffic can be reconstituted at the far end of an ATM network. This form of adaptation is performed in the ATM adaptation layer (AAL). Five types of adaptation layer have been defined. In particular, adaptation layer 1 is used to adapt constant bit rate traffic to the ATM standard.

A general description of a large capacity ATM cross connect system with an STM-ATM conversion function is given by Kurano et al. in Proceedings of Globecom 93, IEEE Global Communications Conference (ISBN 0-7803-0917-0) Vol.3, pages 1461 to 1467. A discussion of bridge functions used in the implementation of ATM networks is given by Nishara et al. in Proceedings of Globecom 93, IEEE Global Communications Conference (ISBN 0-7803-0917-0) Vol.2, pages 888 to 892. Reference is also directed to our co-pending United Kingdom applications No. 9410294.4, No. 9410295.1 and No. 9411894.0 which relate to integrated broad band and narrow band access arrangements.

ATM switches provide point-multipoint capability as a basic function. A combination of an ATM switch and a narrow band to broad band service interworking capability can therefore achieve point-multipoint in the narrow band network. This solution however has the problem that each narrow band to ATM adaptation incurs a 6 millisecond cell assembly delay which means that voice connections through the existing narrow band network will suffer from delay problems which require the use of additional equipment to effect for cancellation.

The object of the invention is to minimise or to overcome this disadvantage.

SUMMARY OF THE INVENTION

According to one aspect of the present invention there is provided a narrow band ATM switch for a communications network and adapted to work into a backplane bus associated with a backplane having ingress and egress facilities so as to separate switching from circuit adaptation and including a number of ports each of which is coupled to a respective adaptive virtual junctor, the switch having means for disassembly and reassembly of ATM narrow band channel payloads by providing a mapping between channel addresses and virtual circuit payloads, means for allocating any channel on the backplane to any time slot in a plurality of virtual circuits whereby to provide a multicast facility, and wherein each said adaptive virtual junctor has a junctor virtual circuit with each of the other said adaptive virtual junctors.

According to another aspect of the invention there is provided a method of switching narrow band channels in an ATM communications network, the method including allocating said channels to time slots in a plurality of broad band virtual circuits by providing a mapping between channel addresses and virtual circuit payloads.

In a further aspect, the invention provides a narrow band ATM switch for a communications network which provides point to multipoint capability on a narrow band channel basis in combination with bulk adaptation to ATM. The switch may be adapted whereby to perform a cell relay function into a narrow band switching fabric and may incorporate means for frame boundary rate adaptation.

The arrangement facilitates inter-working between narrow band and broad band traffic in the public network. The most basic form of inter-working is for voice applications in which a POTS line or an ISDN B-Channel must be adapted to a Virtual Circuit using ATM Adaptation Layer 1 providing 64 kb/s connectivity between the two networks; this is required to work with voice services on an ATM workstation. The cell assembly delay for such a connection is 6 milliseconds which causes potential voice echo problems in many applications; echo cancellation to overcome such problems is well understood but is undesirable to implement. The more general inter-working case is for a P×64 kb/s service typically used for H320 video conference where a value of P=6 is typical; time slot sequence integrity is a special requirement of this application. The AAL1 can be used for unstructured data transfer in which a synchronous bit stream is passed transparently through an ATM network and reconstituted at the far end. For the flexible handling of 64 kb/s channels, the structured data transfer mode in which phase information identifying the start of an n×64 kb/s sub-frame is preferred as it allows 64 kb/s channels to be identified and manipulated.

Multimedia networks can be provided using broad band technology based on ATM or on narrow band technology using 64 kb/s ISDN services and compression technology for voice and video. Switched multimedia is greatly enhanced by switches which provide a point-multipoint or multicast capability as this allows implicit conferencing. Multiple application of the point-multipoint function can be arranged to achieve a multipoint-multipoint service capability.

In a further embodiment, the invention relates to a narrow band switch which provides point-multipoint capability in which the delay for each path conforms to the normal delay of 450 microseconds average (ITU-T Q551) thus allowing the switch to be deployed within the current network without delay problems.

BRIEF DESCRIPTION OF THE DRAWINGS

Embodiments of the invention will now be described with reference to the accompanying drawings in which.

DESCRIPTION OF PREFERRED EMBODIMENT

Figure 1:
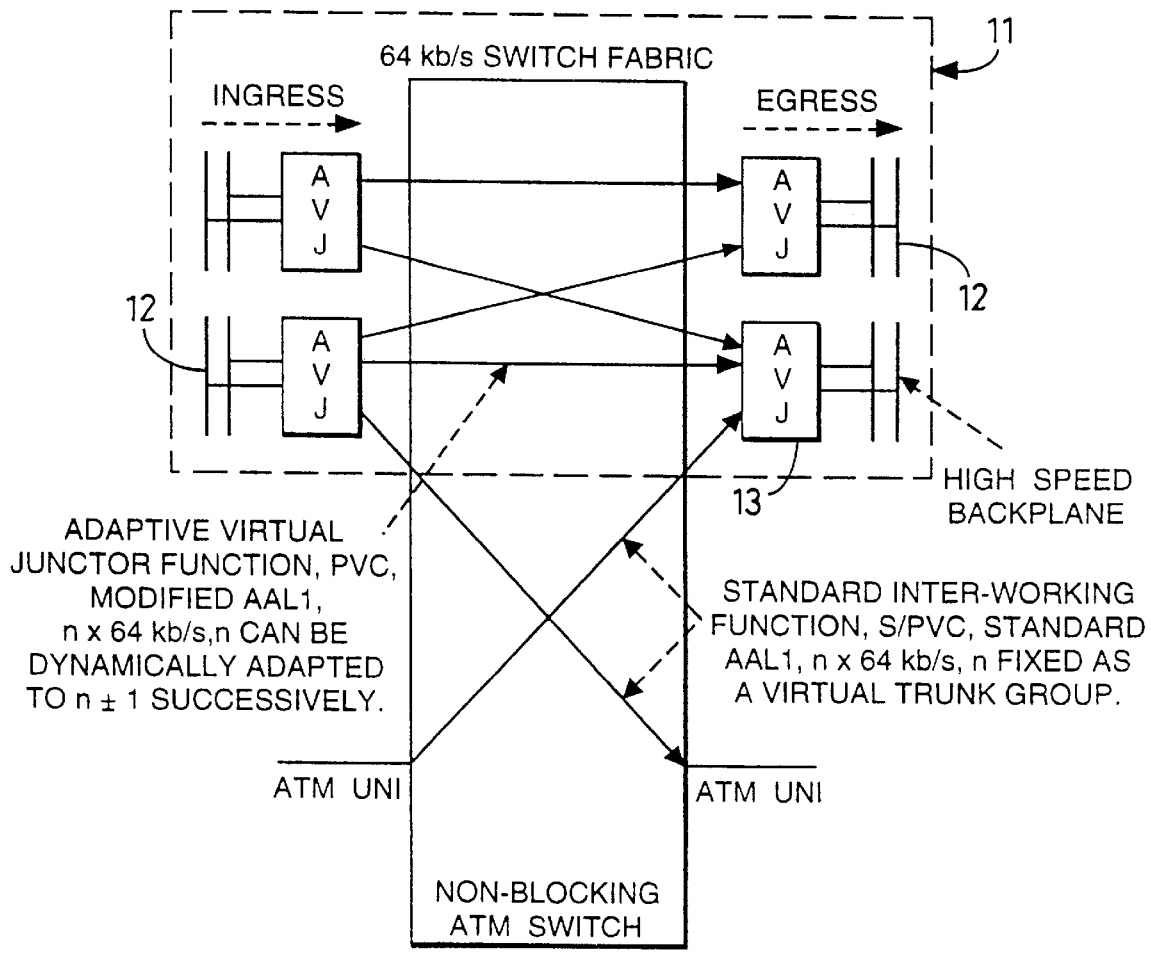
FIG. 1 illustrates the use of an ATM switching element as the basis for a narrow band switching fabric.

Referring to the drawings, a bulk implementation of an inter-working function is illustrated in FIG. 1. A 64 kb/s switching fabric 11 is typically implemented to work into a high capacity backplane bus 12. Lines and trunks work into same bus so as to separate the concerns of switching from circuit adaptation. The inter-working device provides adaptation for e.g. 2048 channels of backplane bus capacity into as many virtual containers (VCs) as are required in order to fill a 155 Mb/s interface to an ATM switch. This requires a number of Virtual Circuits depending on the number of 64 kb/s channels in each virtual circuit.

The arrangement allows any channel on the backplane to be allocated to any time slot in a multiplicity of the virtual circuits to provide a multicast facility at a granularity of a single or multiple 64kb/s circuit. The particular application of this technique is for example to the provision of multimedia services via a broad band ATM network. Whereas the ATM network may provide multicast of cells, this is useful to the provision of narrow band services only when single channel adaptation is used, incurring the aforementioned disadvantages of delay, echo cancellation, and the need to provide switched virtual circuits and signalling in the ATM domain. The ability to multicast in the narrow band domain enables advantages of bulk adaptation to be employed, namely the low delay, N-ISUP signalling, with the ability to locally switch or to trunk the traffic. The broad band network management need not be aware of the narrow band services used in this mode which separates the management aspects of the narrow band from the broad band network yet provides full interworking between the narrow band and the broad band network.

Figure 2:
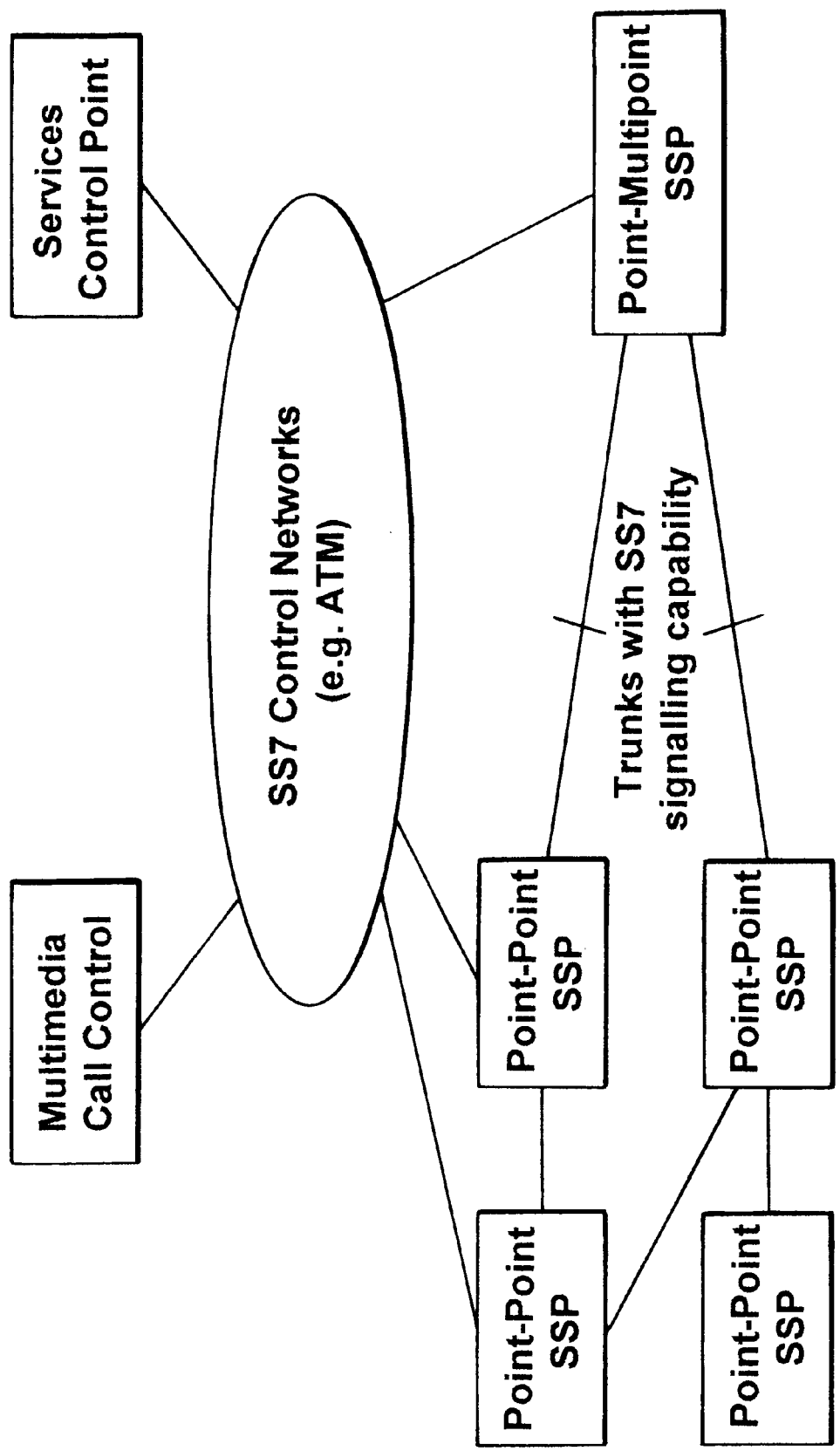
FIG. 2 illustrates the application of the present invention to multimedia services.

A typical application of the switch of FIG. 1 is illustrated in FIG. 2. It is assumed that an existing network has been upgraded to intelligent networking in which each switch in the network provides a point-to-point services switching point (SSP), each SSP receives instructions from a services control point at each significant trigger point in the call process. A point-to-multipoint services switching point is introduced into the network to provide switched multimedia services to the installed base of switches. In the example shown in FIG. 2, the point-to multipoint SSP is a form of switch which allows call control to be exercised from an external server, which is a multimedia call control server in the example shown. Point-to-multipoint calls initiated in the point-to-multipoint SSP can be extended on a point-to-point basis into the existing network using the trunks with SS7 capability which link the point-to-multipoint SSP with the existing network. This network architecture allows narrow band multimedia services to be delivered with all of the features planned for the broad band network.

The device used to adapt an ATM switch into a 64 kb/s fabric is termed an adaptive virtual junctor (AVJ). An AVJ 13 is attached to each port of the ATM switch which is to be used as part of the 64 kb/s fabric illustrated in FIG. 1. Each AVJ has a junctor virtual circuit with each other AVJ. Each junctor VC comprises an n×64 kb/s connection in which n is an integer allowed to vary e.g. between 6 and 2048. Preferably 6 is set as a minimum of n so that the cell assembly delay of the fabric is never more than one millisecond so as to avoid echo problems. A control element 14 is associated with each AVJ and all control elements use the ATM fabric to communicate control signals. The ATM switch is non-blocking, so that if a channel is available at an ingress AVJ and an egress AVJ it is also by definition available through the fabric.

When an ingress AVJ intends to change a VC from n×64 kb/s to (n±1)×64 kb/s; it first signals ahead to the control element of the egress AVJ to identify the channel and the connection requirements to the backplane. The change is then implemented in the ingress function and the change is signalled within the junctor VC, preserving frequency and phase across the junctor VC. The act of changing the capacity of the network of junctor VCs on a call-by-call basis, is equivalent to the operation of a 64 kb/s switching fabric from the perspective of attached lines and trunks. As the mechanism is the extension of the standard inter-working function, it is still possible to use part of the ATM switch for broad band purposes and to provide narrow band and broad band inter-working.

Whereas a group of AVJs dynamically adapt the capacity of the junctor VCs to adapt to the dynamic calling incidence of the 64 kb/s fabric, a virtual trunk group (VTG) may provide a semipermanent pool of capacity between two switches which can be used as required to establish calls between the two switches. The respective roles are illustrated in FIG. 1. The physical trunks between switches are implemented purely in the ATM domain. The capacity of these trunks is utilised to provide logical routes between destinations. A logical route comprises a number of VCs providing n×64 kb/s, where for example, 6<n<30, and in addition an associated N-ISUP signalling channel. The lower limit of 6 is preferred as discussed above to avoid echo problems due to cell assembly delay. This means that a community of interest of at least six channels is desirable to justify a logical route. Changes to a logical route are achieved through network management action, and have a granularity of one 64 kb/s channel following initial establishment. Within each ATM switch, a network of AVJs maintains a 64 kb/s fabric function. The VTGs are connected through the synchronous backplane to the AVJ and have the ability to connect any backplane channel to any 64 kb/s time slot within any of the set of n×64 kb/s VCs forming a logical route. In FIG. 1, the VTGs are depicted as incorporated with the AVJs.

Figure 3:
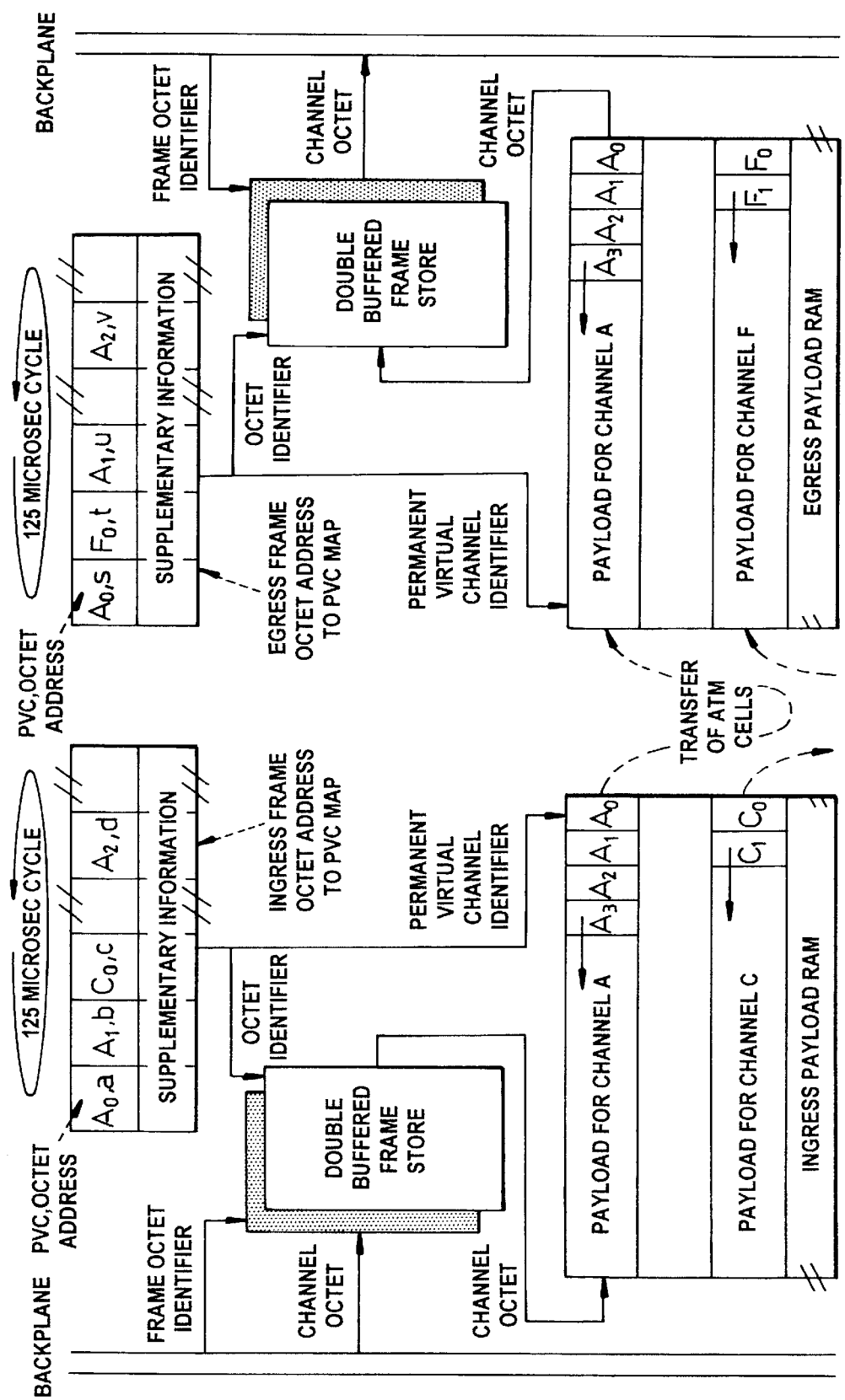
FIG. 3 illustrates the ingress and egress process of an Adaptive Virtual Junctor means that can assemble and disassemble cell payloads in an arbitrary order of narrow band traffic.

The principle of the adaptive virtual junctor is illustrated schematically in FIG. 3. The diagram shows the process of assembly and disassembly of ATM payloads, the process cycling every 125 microseconds, although those skilled in the art will appreciate that any frame duration may be supported. Both the ingress and egress processes use an octet address to PVC map. This map relates a 64 kb/s channel octet to the payload of a virtual circuit. The ingress side uses a frame store whose order of loading and unloading may therefore differ. The address of the octet in the frame from the backplane is used to access the map to provide a simple means to access all valid locations in the map once per 125 microsecond cycle. This map identifies a virtual circuit and an octet address in the frame, together with any supplementary information that may be needed for cell assembly. The ingress map contains an address in the frame store such that the order in which the channel octets are concatenated into the payloads of virtual circuits may be freely chosen to match their time sequence ordering on the backplane of the egress process or any other desired order.

When completed, payloads are built into ATM cells using AAL1 structured data transfer for transmission across the network. On receipt at the desired destination, the payloads are buffered to provide an elastic buffer to compensate for jitter and cell delay variation and for the payload disassembly process, under action of a similar map to that of the ingress process. The egress process accepts an octet address in the frame directly from the backplane and applies it to the PVC map, which stores an associated PVC identifier, octet address and any supplementary information as described for the ingress process. Octets are removed form the payload of cells for any given PVC and are transferred to a location in a frame store. At the end of the cycle, the frame store is offered to the backplane and is emptied in the time slot sequence order of the frame.

The contents of this map are primed and updated by an overall control process which has not been shown to ease clarity.

Figure 4:
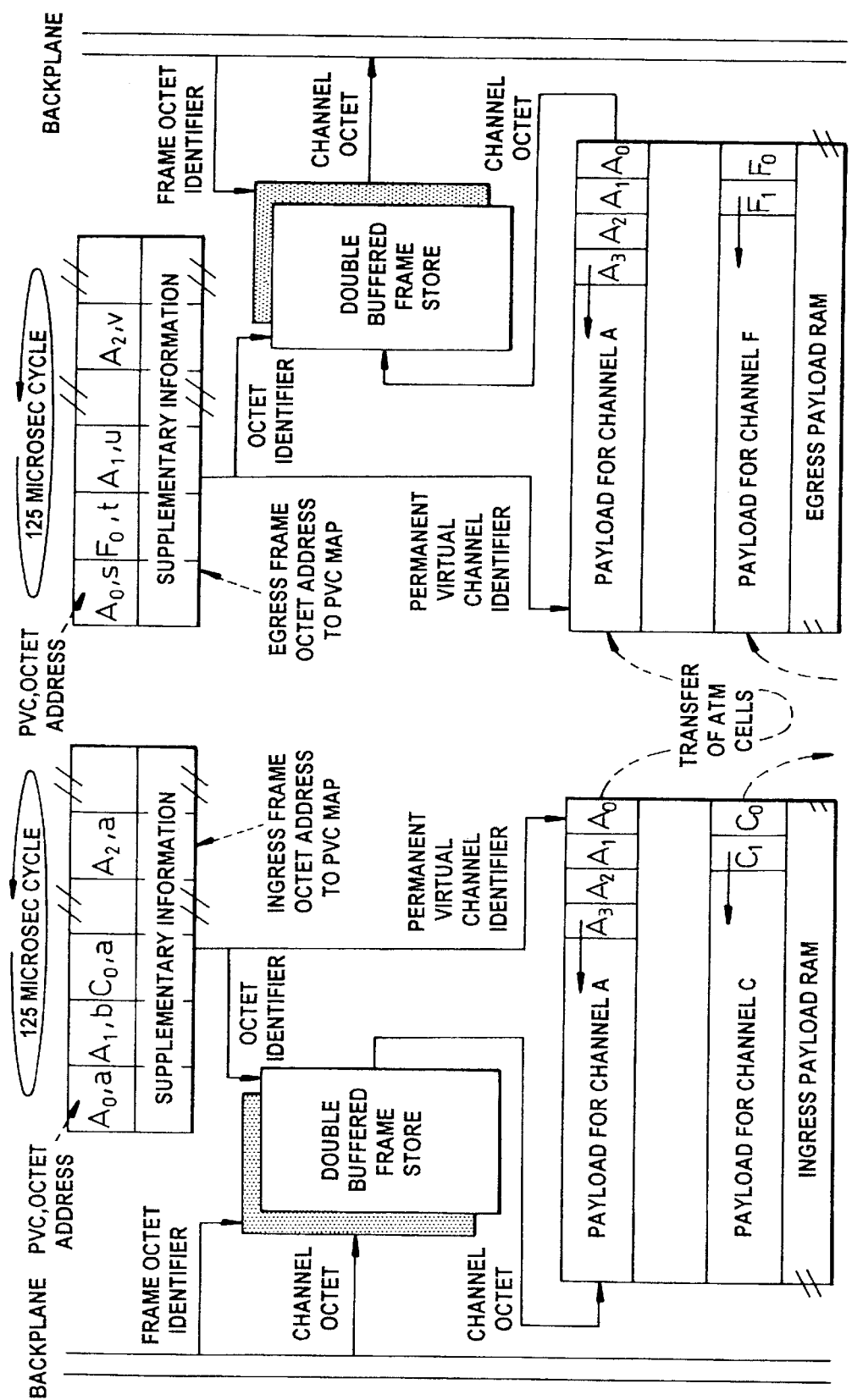
FIG. 4 illustrates an embodiment of the invention wherein the same means may be used to multicast narrow band traffic.

FIG. 4 shows a preferred embodiment of the present invention wherein the adaptive virtual junctor is applied to multicast narrow band n×64 kb/s channels, to a multiplicity of narrow band destinations via the same ATM adaptation means. The multicast facility is enabled by repeating in the PVC map an octet address in the frame store of the channel to be multicast, and using it as frequently in the map as the required number of narrow band destinations. These destinations may be served by the same or a different ATM PVC or junctor, which may employ all the aforementioned and referenced means for creating a single switch fabric employing the same narrow band signalling means and the same rate adaptation means, and which may multicast narrow band channels not exceeding the bandwidth of the switch port to which an adaptive virtual junctor may be connected.

Figure 5:
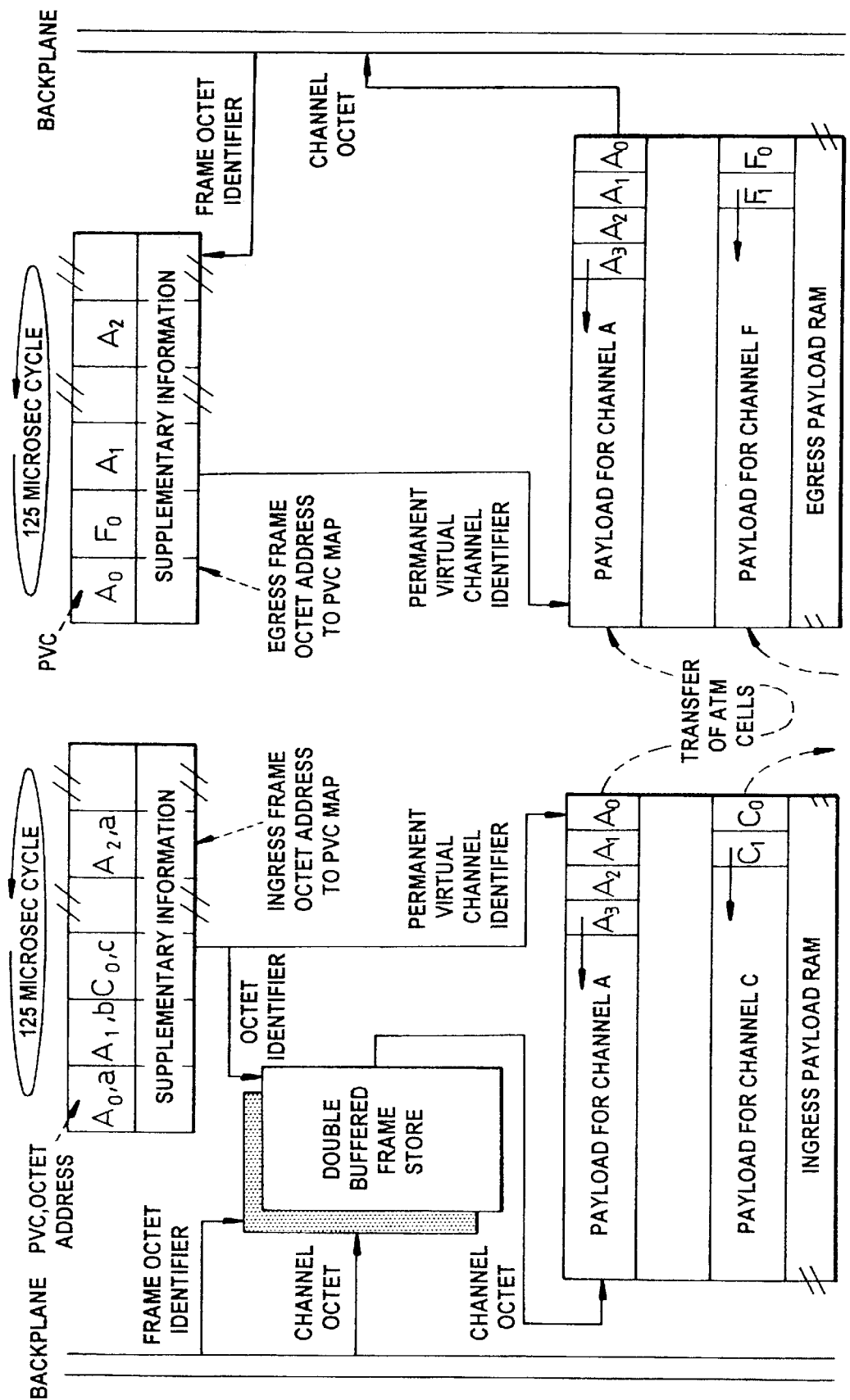
FIG. 5 illustrates another embodiment of the Adaptive Virtual Junctor means, wherein the cell payloads contain ordered narrow band traffic with reduced path delay.

FIG. 5 shows a further embodiment which requires only one means of time slot resequencing. This resequencing is provided by the double buffered frame store of the ingress process, which may therefore order the time slots in the payloads of the cells of the junctor PVCs in their time slot sequence order of the respective egress backplane, thus providing the same aforementioned multicast facility. In this arrangement the egress double buffered frame store is no longer required. The advantage of this embodiment is a reduction in the path delay across the 64 kb/s switching fabric. This will allow the single fabric switch to comply for example with ITU Standard Q551.

Figure 6:
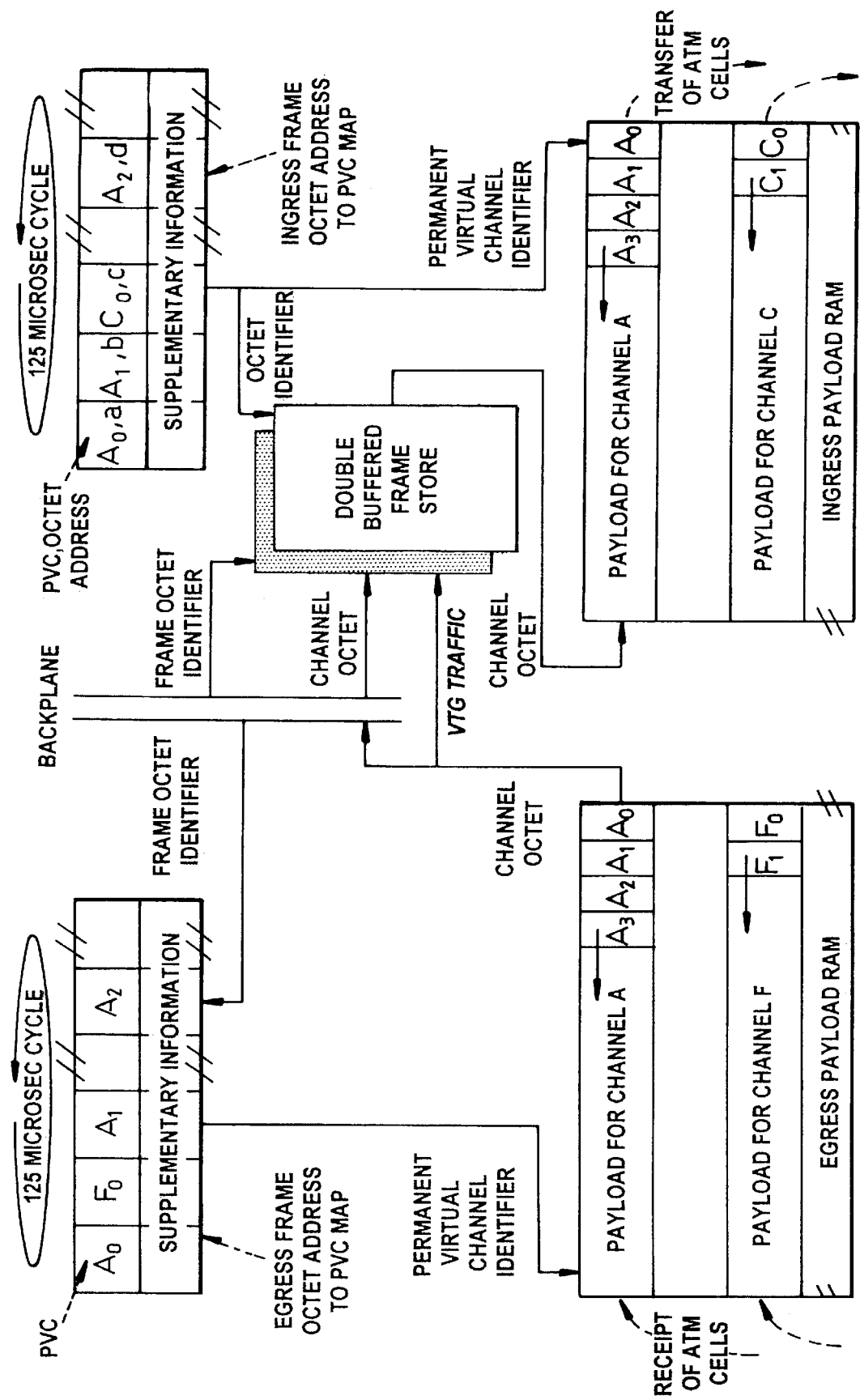
FIG. 6 illustrates an embodiment of the invention for trunking applications wherein the junctor size may remain fixed but of arbitrary size forming a Virtual Trunk Group.

The process of the Virtual Trunk Group Device (VTG) is illustrated in FIG. 6. This is similar to the AVJ, other than that the channel's octets are free to be permuted in order both on assembly and disassembly of the payloads of the corresponding VC. The VTG is only accessed across the switch fabric by other AVJs, such that it need never accept local traffic directly from the backplane, nor deliver it directly to the backplane. Local traffic is adapted by an AVJ and is then consolidated at a port on the switching fabric with traffic from other AVJs before being assembled into a VTG. A reciprocal process is implemented on receipt. The VTG requires the ability to resequence time slots at both ends of the trunk such that the VTG channels may be "nailed-up" in the connection tables or PVC maps. Since the VTG application always requires back to back working of the two back planes, the ingress and egress resequencing may be provided by one pair frame stores in common with the AVJs with which the VTG communicates. This is more readily understood with regard to FIG. 2, where back to back working between the egress and ingress backplane would render one pair of frame stores redundant. FIG. 6 illustrates this process by combining the AVJ and VTG functions in one device. Cells arriving in the egress process are offered to the backplane if they represent narrow band channels of local traffic from another AVJ. Narrow band channels of a VTG are written into a local frame store along with local traffic that is to be transmitted to another AVJ, possibly for onward trunking or as local traffic at that AVJ destination. The egress process may also receive cells from another AVJ and directly write their payload contents to the frame store for those narrow band channels that are to form an ingress VTG. The position in the frame store of AVJ to VTG, VTG to AVJ and local to AVJ channels may be freely chosen and form orthogonal sets of channels, with orthogonal access times to the frame store.

We claim:

1. A narrow band ATM switch for a communications network and adapted to work into a backplane bus associated with a backplane having ingress and egress facilities so as to provide separate switching and circuit adaptation and including a number of ports each of which is coupled to a respective adaptive virtual junctor, the switch having means for disassembly and re-assembly of ATM narrow band channel payloads by providing a mapping between channel addresses and virtual circuit payloads, means for allocating any channel on the backplane to any time slot in a plurality of virtual circuits to provide a multicast facility, wherein each adaptive virtual junctor has a junctor virtual circuit incorporating a plurality of narrow band channels with each of the other adaptive virtual junctors, wherein each junctor virtual circuit is dynamically adaptable in capacity on a call by call basis to accommodate a greater or lesser number of said narrow band channels, and wherein said adaptive virtual junctors are provided with access to respective virtual trunk groups so as to establish calls to one or more remote switches.

2. A narrow band ATM switch as claimed in claim 1, and including means for repeating a channel address in the virtual circuit map whereby to provide multicast of that channel.

3. A narrow band ATM switch as claimed in claim 1, wherein each said junctor virtual circuit comprises an n×64 kilobit/second connection where n has an integral value.

4. A narrow band ATM switch as claimed in claim 3, wherein n has a value between 6 and 2048.

5. A narrow band ATM switch as claimed in claim 1, and including time slot resequencing means for ordering time slots in the payloads of cells of the junctor permanent virtual channels in the time slot sequence order of the egress backplane.

6. A communications network incorporating a plurality of ATM switches as claimed in claim 1.

* * * * *